United States Patent
Condamin et al.

(10) Patent No.: US 10,759,308 B2
(45) Date of Patent: Sep. 1, 2020

(54) SUPPORT ASSEMBLY

(71) Applicant: Lear Corporation, Southfield, MI (US)

(72) Inventors: Thibaud Condamin, Orliénas (FR); Nordine Hamtache, Roche la Moliere (FR); Antoine Moulin, Aurec-sur-Loire (FR)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/131,360

(22) Filed: Sep. 14, 2018

(65) Prior Publication Data

US 2019/0337421 A1 Nov. 7, 2019

(30) Foreign Application Priority Data

May 4, 2018 (FR) ...................................... 18 53891
May 4, 2018 (FR) ...................................... 18 53892
(Continued)

(51) Int. Cl.
*B60N 2/07* (2006.01)
*B60N 2/54* (2006.01)
(Continued)

(52) U.S. Cl.
CPC ......... *B60N 2/0732* (2013.01); *B60N 2/0715* (2013.01); *B60N 2/0722* (2013.01);
(Continued)

(58) Field of Classification Search
CPC ......... B60N 2/0732; B60N 2/502; B60N 2/54
(Continued)

(56) References Cited

U.S. PATENT DOCUMENTS 2,678,082 A * 5/1954 Walker ................. B60N 2/7064
248/624
4,282,631 A * 8/1981 Uehara ............... E05D 15/0665
16/102
(Continued)

FOREIGN PATENT DOCUMENTS

DE 102005007430 A1 3/2006
DE 102010063615 A1 2/2012
(Continued)

OTHER PUBLICATIONS

Co-pending U.S. application, Condamin, et al., U.S. Appl. No. 16/131,384, filed Sep. 14, 2018.
(Continued)

*Primary Examiner* — Muhammad Ijaz
(74) *Attorney, Agent, or Firm* — Fishman Stewart PLLC

(57) ABSTRACT

A support assembly includes a support member, a side member, and a resilient member. The support member may be configured to engage a track. The resilient member may be connected to the support member, and/or the support member may be connected to the side member. The resilient member may be configured to compensate for different orientations of the side member. The resilient member may be configured to maintain a position of the side member relative to the track. The resilient member may be configured to compensate for different lateral positions of the side member relative to the track. The resilient member may be connected to a lateral side of the support member. The resilient member may be disposed proximate a first end of the support member, and/or a second resilient member may be disposed proximate a second end of the support member.

20 Claims, 9 Drawing Sheets

(30) Foreign Application Priority Data

| May 4, 2018 | (FR) | 18 53893 |
|---|---|---|
| May 4, 2018 | (FR) | 18 53894 |

(51) Int. Cl.

| B60N 2/50 | (2006.01) |
|---|---|
| B60N 2/08 | (2006.01) |
| B60N 2/20 | (2006.01) |
| B60R 22/22 | (2006.01) |
| B60N 2/90 | (2018.01) |

(52) U.S. Cl.
CPC ......... *B60N 2/0806* (2013.01); *B60N 2/0818* (2013.01); *B60N 2/0843* (2013.01); *B60N 2/20* (2013.01); *B60N 2/502* (2013.01); *B60N 2/54* (2013.01); *B60N 2/933* (2018.02); *B60R 22/22* (2013.01)

(58) Field of Classification Search
USPC ............ 248/560, 429, 298.1, 424, 425, 430; 49/113, 130, 150, 425, 420, 421; 16/102
See application file for complete search history.

(56) References Cited

U.S. PATENT DOCUMENTS

| 4,511,187 | A | 4/1985 | Rees |
| 4,575,295 | A | 3/1986 | Rebentisch |
| 4,830,531 | A | 5/1989 | Condit et al. |
| 4,961,559 | A * | 10/1990 | Raymor ............... B60N 2/0707 248/429 |
| 5,489,173 | A | 2/1996 | Hofle |
| 5,655,816 | A | 8/1997 | Magnuson et al. |
| 5,899,532 | A | 5/1999 | Paisley et al. |
| 5,964,442 | A | 10/1999 | Wingblad et al. |
| 6,036,157 | A * | 3/2000 | Baroin ................. B60N 2/0705 248/429 |
| 6,227,595 | B1 | 5/2001 | Hamelin et al. |
| 6,439,531 | B1 | 8/2002 | Severini et al. |
| 6,719,350 | B2 | 4/2004 | Duchateau et al. |
| 6,736,458 | B2 | 5/2004 | Chabanne et al. |
| 7,300,091 | B2 | 11/2007 | Nihonmatsu et al. |
| 7,434,883 | B2 | 10/2008 | Deptolla |
| 8,702,170 | B2 | 4/2014 | Abraham et al. |
| 8,757,720 | B2 | 6/2014 | Hurst, III et al. |
| 8,967,719 | B2 | 3/2015 | Ngiau et al. |
| 9,010,712 | B2 | 4/2015 | Gray et al. |
| 9,340,125 | B2 | 5/2016 | Stutika et al. |
| 9,663,232 | B1 | 5/2017 | Porter et al. |
| 2010/0117275 | A1* | 5/2010 | Nakamura ............. E02F 9/166 267/133 |
| 2012/0112032 | A1* | 5/2012 | Kohen .................... B60N 2/24 248/430 |
| 2015/0048206 | A1 | 2/2015 | Deloubes |
| 2017/0166093 | A1 | 6/2017 | Cziomer et al. |
| 2019/0001846 | A1 | 1/2019 | Jackson et al. |
| 2020/0009995 | A1 | 1/2020 | Sonar |

FOREIGN PATENT DOCUMENTS

| DE | 102015212100 | A1 | 12/2015 |
| DE | 102016113409 | A1 | 4/2017 |
| EP | 0565973 | A1 | 10/1993 |
| EP | 0783990 | A1 | 7/1997 |
| EP | 1176047 | A1 | 1/2002 |
| EP | 1209024 | A1 | 5/2002 |
| EP | 2298609 | A2 | 3/2011 |
| EP | 1699661 | B1 | 8/2012 |
| EP | 3150426 | A1 | 4/2017 |
| FR | 2762814 | A1 | 11/1998 |
| FR | 2864481 | B1 | 4/2006 |
| FR | 2986751 | A1 | 8/2013 |
| JP | 2013230721 | A | 11/2013 |
| WO | 01/87665 | A1 | 11/2001 |
| WO | 2005/068247 | A2 | 7/2005 |

OTHER PUBLICATIONS

Co-pending U.S. application, Condamin, et al., U.S. Appl. No. 16/131,404, filed Sep. 14, 2018.

Co-pending U.S. application, Condamin, et al., U.S. Appl. No. 16/131,415, filed Sep. 14, 2018.

Co-pending U.S. application, Condamin, et al., U.S. Appl. No. 16/131,614, filed Sep. 14, 2018.

* cited by examiner

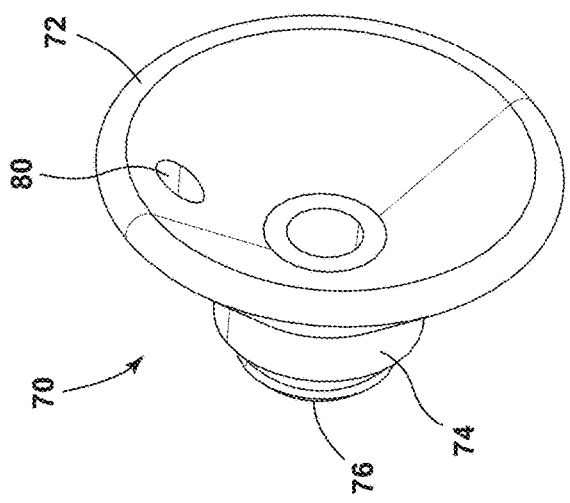
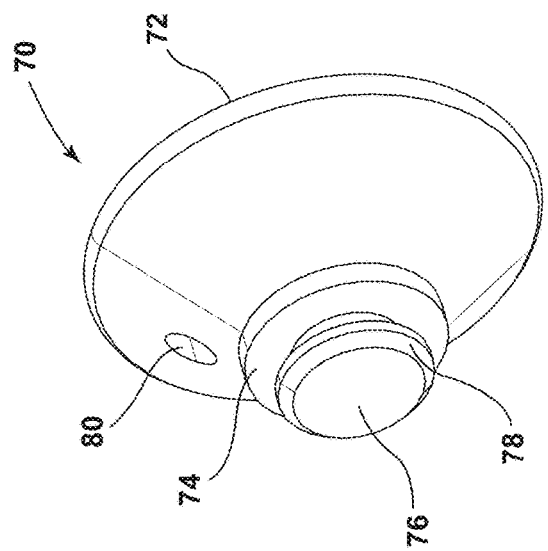
FIG. 2A
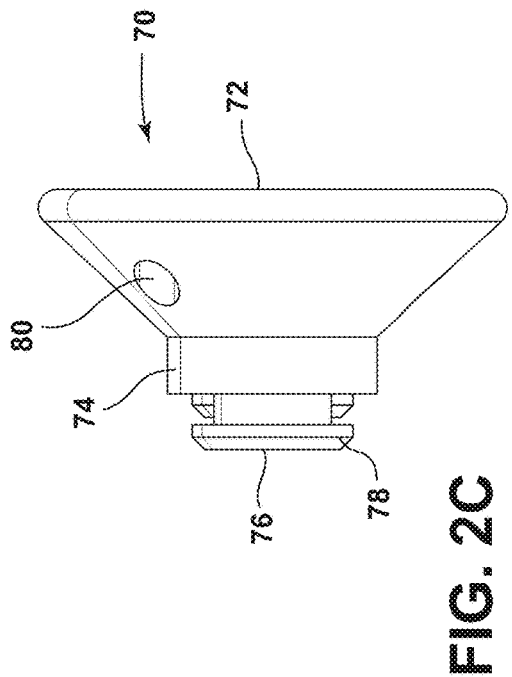
FIG. 2B
FIG. 2C

SUPPORT ASSEMBLY

CROSS-REFERENCE TO RELATED APPLICATIONS

This application claims the benefit of French Patent Application Ser. No. 1853891, filed on May 4, 2018; French Patent Application Ser. No. 1853892, filed on May 4, 2018; French Patent Application Ser. No. 1853893, filed on May 4, 2018; and French Patent Application Ser. No. 1853894, filed on May 4, 2018; the disclosures of which are hereby incorporated herein by reference in their entireties.

TECHNICAL FIELD

The present disclosure generally relates to a support assembly, including support assemblies that may be used in connection with seat assemblies, such as vehicle seat assemblies.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some support assemblies may be relatively complex and/or may not provide sufficient functionality. Some support assemblies may not be configured to compensate for manufacturing variances and/or external forces acting on the support assemblies.

There is a desire for solutions/options that minimize or eliminate one or more challenges or shortcomings of support assemblies. The foregoing discussion is intended only to illustrate examples of the present field and should not be taken as a disavowal of scope.

SUMMARY

In embodiments, a support assembly may include a support member, a side member, and/or a resilient member. The support member may be configured to engage a track. The resilient member may be connected to the support member, and/or the support member may be connected to the side member. The resilient member may be configured to compensate for different orientations of the side member. The resilient member may be configured to maintain a position of the side member relative to the track. The resilient member may be configured to compensate for different lateral positions of the side member relative to the track. The resilient member may be connected to a lateral side of the support member. The resilient member may be disposed proximate a first end of the support member, and/or a second resilient member may be disposed proximate a second end of the support member. The resilient member and/or the second resilient member may be disposed on a lateral side of the support member. The support assembly may include a third resilient member and/or a fourth resilient member. The third resilient member and/or the fourth resilient member may be disposed on a second lateral side of the support member. The lateral side may be opposite the second lateral side.

With embodiments, the support assembly may include a second track, a second support member, and/or a second side member. The second support member may be connected to the second side member. The second support member may be fixed to the second track such that relative lateral movement between the second support member and the second track may be substantially prevented. The second support member may not include a resilient member, and/or the resilient member may be configured to compensate for lateral movement of the second side member relative to the second support member. The resilient member may compensate for different lateral positions of the side member relative to the track. The second support member may be rigidly fixed to the second side member.

The resilient member may be configured to compensate for forces applied to the second side member. The support member may include a connector, and/or the connector may be configured to engage the side member. The connector may project from a lateral side of the support member. The side member may include an aperture, and/or the aperture may be configured to receive a portion of the connector. The connector may limit longitudinal and/or vertical movement of the side member relative to the support member. The resilient member may be substantially cone-shaped. The resilient member may include a vent hole. The resilient member may be substantially centered on a lateral side of the support member.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIGS. 2A and 2B are perspective views generally illustrating portions of embodiments of resilient members according to teachings of the present disclosure.

FIG. 2C is a side view generally illustrating portions of an embodiment of a resilient member according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1A:
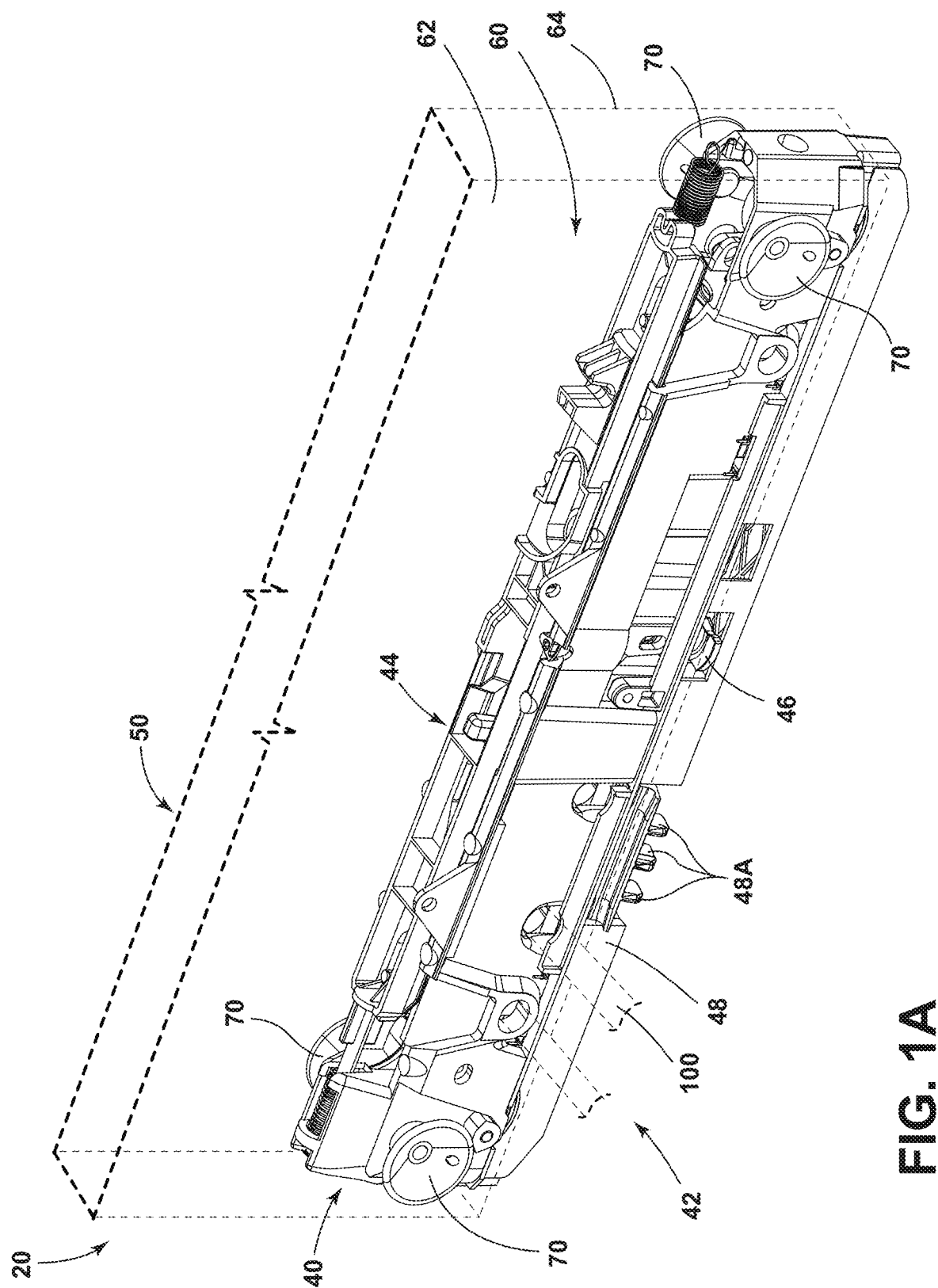
FIG. 1A is a perspective view generally illustrating an embodiment of a support assembly according to teachings of the present disclosure.
Figure 1B:
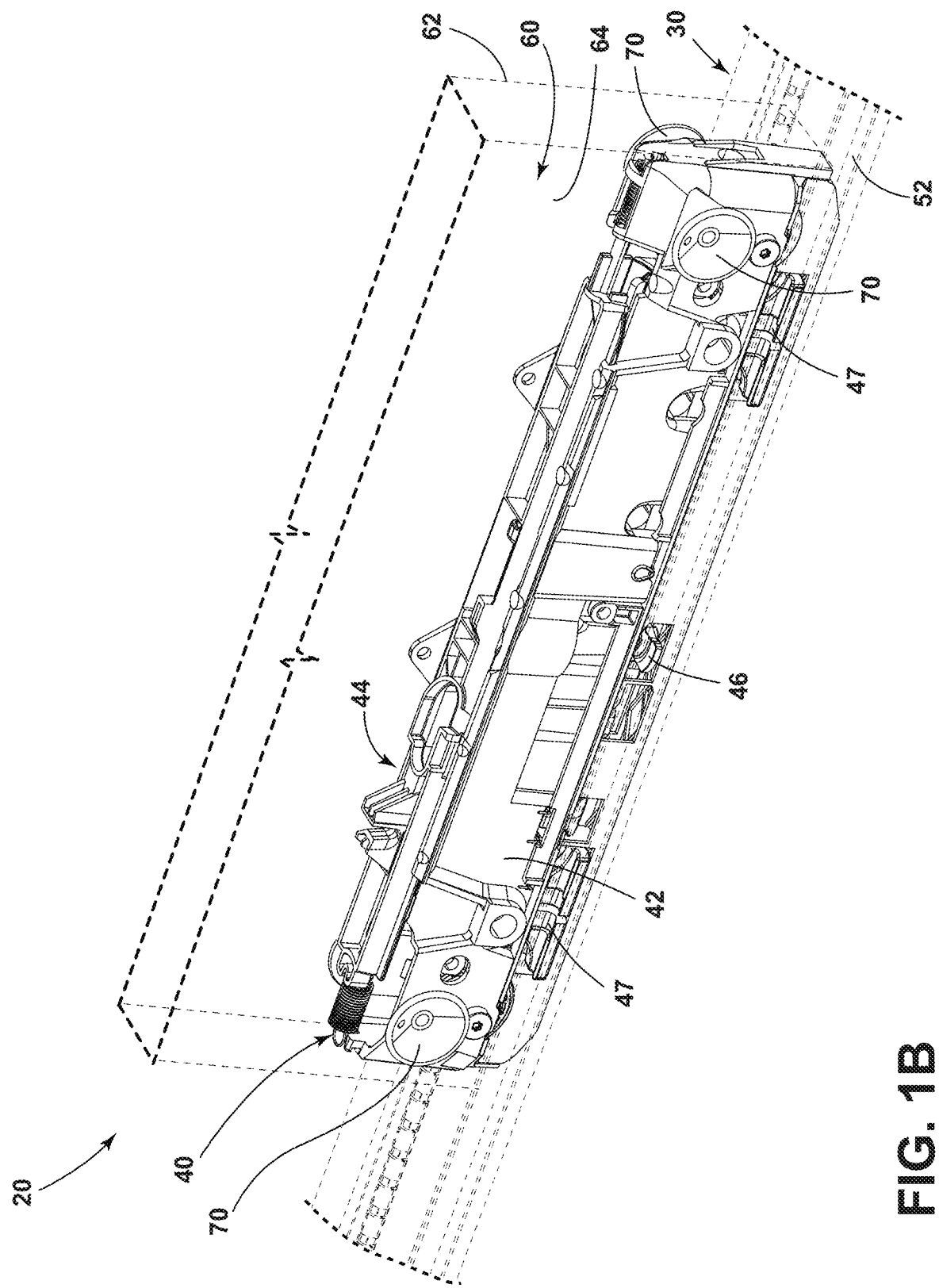
FIG. 1B is a perspective view generally illustrating an embodiment of a support assembly with a track according to teachings of the present disclosure.

In embodiments, such as generally illustrated in FIGS. 1A and 1B, a support assembly 20 may include a track 30, a support member 40, a side member 60, and/or one or more resilient members 70. The support assembly 20 may be configured to support an external component 50 (e.g., a vehicle seat and/or seating element) on a track 30. The support member 40 may move along a track 30. The track 30 may be connected to a mounting surface 52 (e.g., such as a floor of a vehicle).

With embodiments, a support member 40 may be connected to a side member 60 and/or a track 30. The support member 40 may be configured to connect to (e.g., engage) a track 30. The support member 40 and/or the track 30 may extend substantially longitudinally. For example and without limitation, the support member 40 may move (e.g., slide and/or roll) in a longitudinal direction along the track 30. The support member 40 may selectively engage and/or disengage from the track 30.

In embodiments, the support member 40 may include a cassette configuration, and/or may include a cam 46, anchoring components 47, and/or a locking component 48, some or all of which may be configured to selectively connect the support member 40 with the track 30. The cam 46, the anchoring components 47, and/or the locking component 48 may be disposed substantially within the support member 40. The cam 46 may be configured to rotate about a vertical axis. The cam 46 may limit vertical movement and/or play between the support member 40 and the track 30. The anchoring components 47 may limit vertical disengagement of the support member 40 with the track 30, such if the support assembly is subjected to large loads (e.g., vehicle crash loads). The locking component 48 may include one or more track locking portions 48A (see, e.g., FIG. 1A) that may be move into and out of engagement with the track 30 to restrict longitudinal movement of the support member 40. The support member 40 may, for example and without limitation, be substantially rectangular shaped. The support member 40 may include an inner side 42 and/or an outer side 44. The inner side 42 and/or the outer side 44 may be lateral sides. The inner side 42 and/or the outer side 44 may be configured for connection with a side member 60.

In embodiments, a side member 60 may be substantially planar and/or may connect to an external component 50. The external component 50 may include a seating surface, a seat body portion, and/or a support cushion, among other components. The side member 60 may extend substantially in a longitudinal direction (e.g., parallel to the support member 40 and/or the track 30) and/or in a vertical direction. The side member 60 may be connected to the support member 40 via one or more connectors 100 (see, e.g., FIG. 1A). In embodiments, the side member 60 may be subject to various loads. Additionally or alternatively, the support assembly 20 may include variances in materials and/or manufacturing.

In embodiments, such as generally illustrated in FIGS. 1A and 1B, a support assembly 20 may include one or more resilient members 70 that may be configured to compensate for loads and/or material variances. The resilient members 70 may be configured to maintain an alignment of the support member 40 with respect to the track 30 when under a load, such as due to forces from the side member 60. The resilient members 70 may be connected to (e.g., may contact and/or may be attached to) an inner side 42 and/or an outer side 44 of a support member. Additionally or alternatively, the resilient members 70 may be connected at or about a first portion 62 and/or a second portion 64 of the side member 60. A resilient member 70 may be positively connected to one of the support member 40 and the side member 60, and may be non-positively connected with the other of the support member 40 and the side member 60.

With embodiments, such as generally illustrated in FIGS. 2A, 2B, and 2C, resilient members 70 may include one or more of a variety of shapes, sizes, materials, and/or configurations. For example and without limitation, a resilient member 70 may be substantially cone-shaped, v-shaped, pyramid-shaped, dome-shaped, and/or cylindrical, among other shapes. The resilient members 70 may include a generally flexible and/or resilient material (e.g., rubber, flexible polymer, etc.). A resilient member 70 may include a first side 72 and a second side 74. A radius of the first side 72 may be larger than a radius of the second side 74. The first side 72 and/or the second side 74 of the resilient member 70 may connect to the inner side 42 and/or the outer side 44 of the support member 40.

The first side 72 and/or the second side 74 may connect to the side member 60. For example, a support assembly 20 may include a first resilient member 70A with a first side 72 that may be connected to the side member 60, and a second side 74 that may be connected to the support member 40 (see, e.g., FIG. 4B). The support assembly 20 may include a second resilient member 70B with a first side 72 that may be connected to the support member 40, and a second side 74 that may be connected to the side member 60. A first resilient member 70A and a second resilient member 70B may be disposed in opposite orientations (e.g., may face opposite directions).

Referring again to FIGS. 2A-2C, in embodiments, a resilient member 70 may include a flange 76. The flange 76 may project from the second side 74 of the resilient member 70. The flange 76 may include one or more of a variety of shapes, sizes, and/or configurations. For example and without limitation, the flange 76 may be oval-shaped and/or circular. The flange 76 may engage an aperture 77 of the inner side 42 and/or outer side 44 of the support member 40. Additionally or alternatively, the flange 76 may engage an aperture 77 of the side member 60. The aperture 77 and the flange 76 may be substantially the same general shape. The flange 76 may be configured to engage an aperture 77 that is smaller than the flange.

The aperture size (e.g., radius) may be smaller than the flange size (e.g., radius) such that after insertion of the flange 76 into the aperture 77, a portion of the support member 40 or a side member 60 may be disposed between the second side 74 of the resilient member 70 and the flange 76. In embodiments, the flange 76 may deflect and/or deform during insertion into an aperture 77 (e.g., an aperture 77 in the side member 60 and/or the support member 40). The flange 76 may include a tapered edge 78 that may facilitate insertion of the flange 76 into the aperture 77. The second side 74 of the resilient member 70 may deform such that the flange 76 may attach the resilient member 70 to the support member 40 (or a side member 60) via an aperture 77. The first side 72 of the resilient member 70 may deform such as to absorb forces from the side member 60. A flange 76 may be configured to positively connect a resilient member 70 to a support member 40 and/or a side member 60.

Figure 3C:
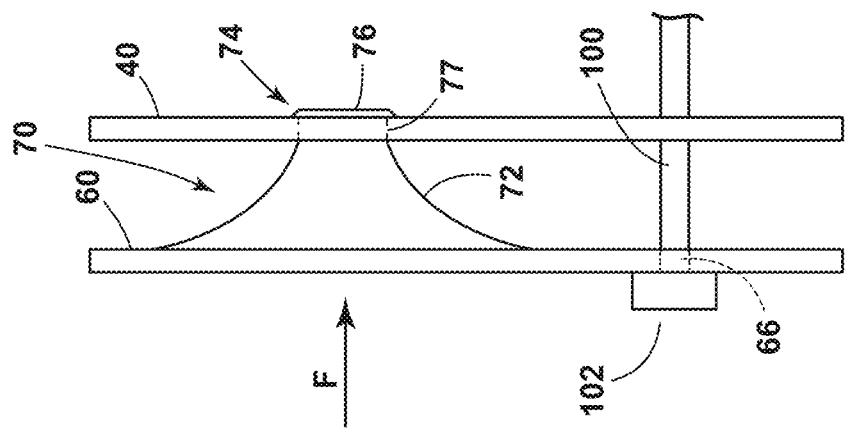
FIGS. 3B and 3C are cross-sectional views generally illustrating portions of embodiments of support assemblies and resilient members in a second position according to teachings of the present disclosure.
Figure 3B:
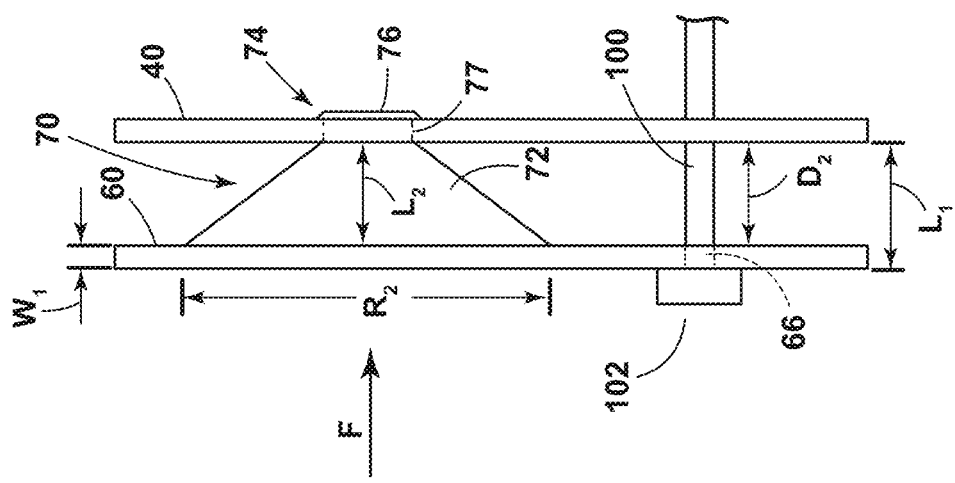
Figure 3A:
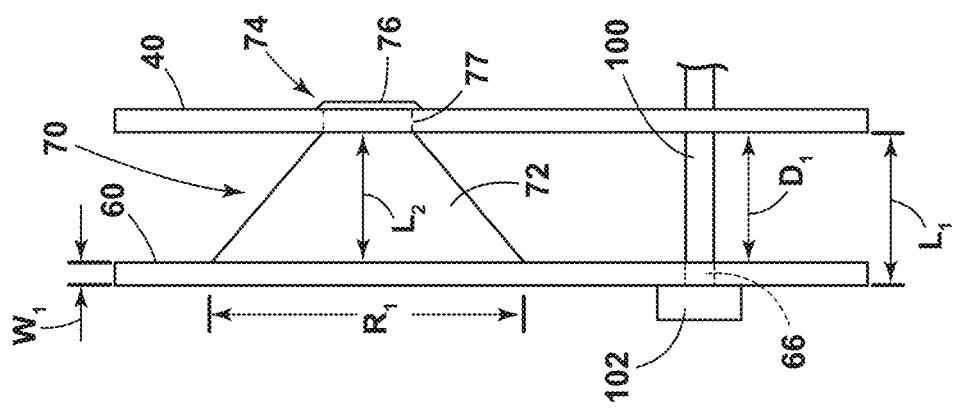
FIG. 3A is a cross-sectional view generally illustrating portions of an embodiment of a support assembly and a resilient member in a design position according to teachings of the present disclosure.

In embodiments, such as generally shown in FIGS. 3A, 3B, and 3C, the resilient member 70 (e.g., the first side 72)

may be configured to compensate for lateral forces F from the side member 60 by deforming (e.g., stretching/deflecting longitudinally and/or laterally). For example and without limitation, the radius of the first side 72 of the resilient member 70 may increase during deformation (e.g., see FIG. 3B). The limit of deformation of the resilient member 70 may correspond to a maximum deviation between the support member 40 and the side member 60 that the resilient member 70 can compensate for while maintaining the alignment of the support member 40 with the track 30.

In embodiments, as shown in FIGS. 3B and 3C (relative to FIG. 3A), a length $L_2$ of a resilient member 70 may decrease during deformation (e.g., length in a lateral direction). A radius $R_1$ of the first side 72 may or may not remain substantially the same during deformation. The lengths $L_2$ of the resilient members 70 may vary depending on the forces F applied to the support member 40. For example and without limitation, the lengths L2 of the resilient members 70 may be equal if the forces applied are uniform.

Referring again to FIGS. 2A-2C, with embodiments, a resilient member 70 may include a vent hole 80. The vent hole 80 may include one or more of a variety of shapes, sizes, and/or configurations. For example and without limitation, the vent hole 80 may be substantially circular, rounded, and/or cylindrical. The vent hole 80 may be configured to relieve air pressure from within the first side 72 if the resilient member 70 is deformed (e.g., pressure that may result from an internal volume of the first side 72 decreasing) between the side member 60 and the support member 40. The vent hole 80 may limit a suction effect between the first side 72 of the resilient member 70 and the side member 60 and/or support member 40.

Figure 3D:
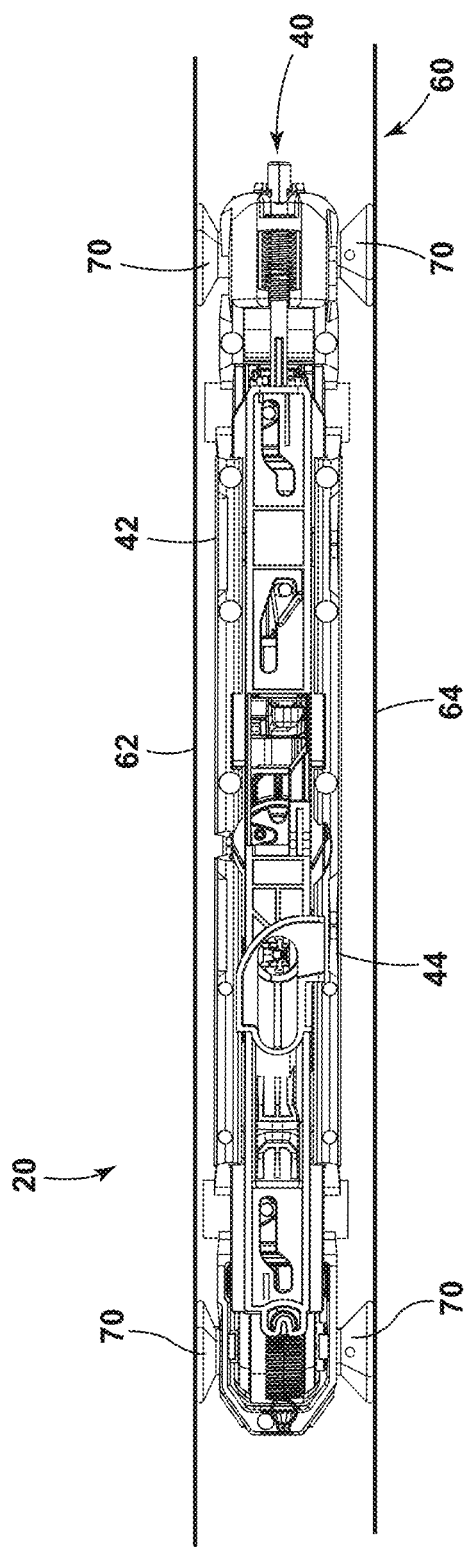
FIGS. 3D and 3E are top views generally illustrating portions of embodiments of support assemblies according to teachings of the present disclosure.
Figure 3E:
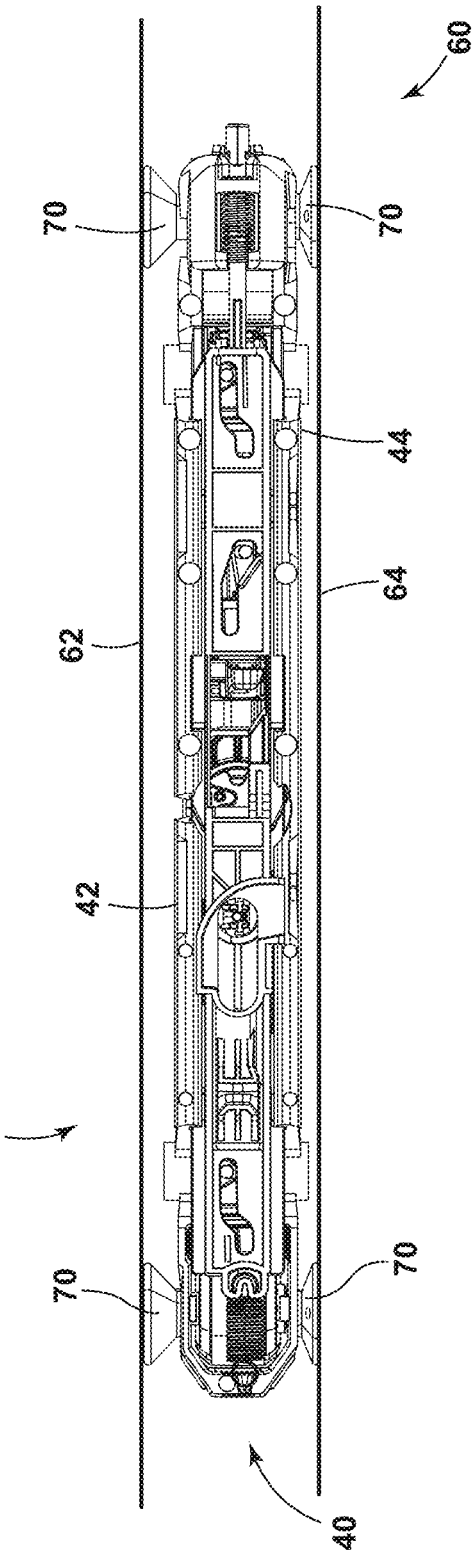

With embodiments, a design position of the support assembly 20 may include all of the resilient members 70 having the same degree of deformation and/or deflection. The design position may include the first portion 62 of the side member 60 disposed the same distance from the inner side 42 of the support member 40 as the second portion 64 of the side member 60 may be disposed from the outer side 44 of the support member 40 (e.g., the support member 40 may be centered between the first portion 62 and the second portion 64). In a second position, such as generally illustrated in FIGS. 3D and 3E, the first side member portion 62 and the second side member portion 64 disposed at different distances from the support member 40. The first side member portion 62 may be closer to the inner side 42 of the support member 40 than the second side member portion 64 may be to the outer side 44 of the support member 40 (see, e.g., FIG. 3D). The resilient members 70 connected to the first portion 62 may be deformed to a greater degree (e.g., may include a smaller length $L_2$) than the resilient members 70 connected to the second portion 64. Alternatively, the second side member portion 64 may be closer to the outer side 44 of the support member 40 than the first side member portion 62 may be to the inner side 42 of the support member 40 (see, e.g., FIG. 3E). The resilient members 70 connected to the second portion 64 may be deform to a greater degree (e.g., may include a smaller length $L_2$) than the resilient members 70 connected to the first portion 62.

Figure 3F:
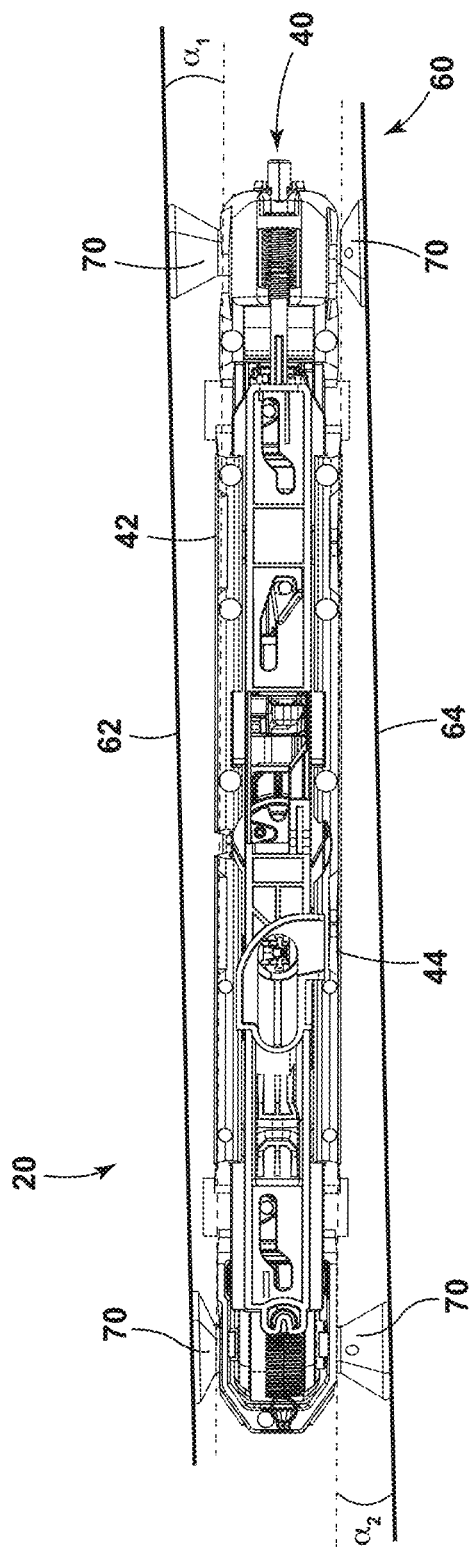
FIGS. 3F and 3G are top views generally illustrating portions of embodiments of support assemblies according to teachings of the present disclosure.
Figure 3G:
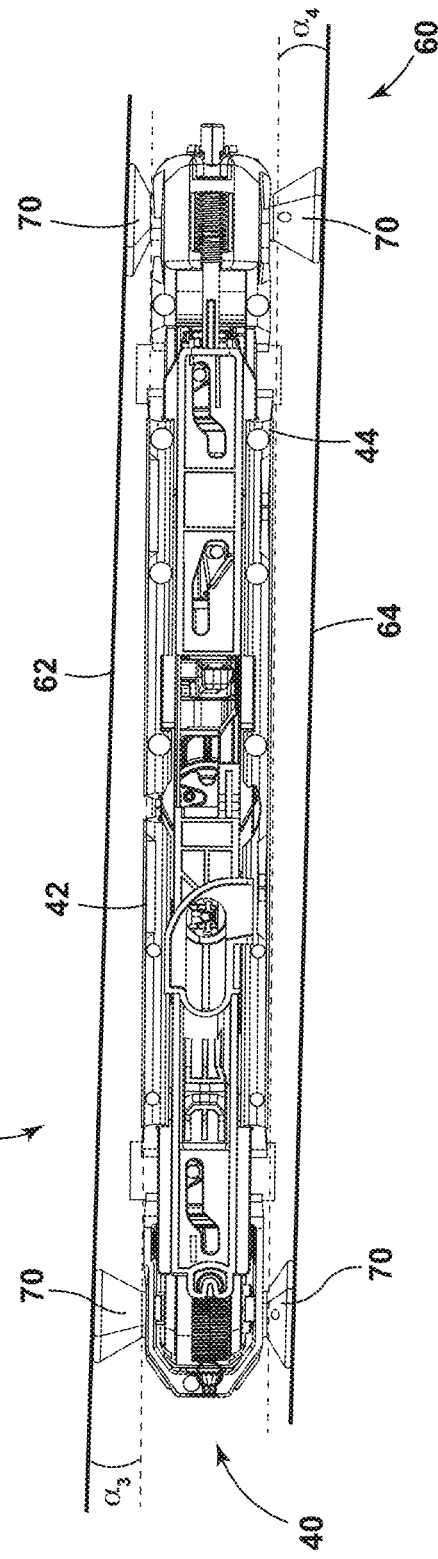

In embodiments, such as generally illustrated in FIGS. 3F and 3G, a support assembly 20 may include a side member 60 that may be angled with respect to the support member 40 such as under load and/or as a result of material variances. In embodiments, the side member 60 may or may not be substantially parallel to the support member 40. For example, the side member 60 may be disposed at an oblique angle with respect to the support member 40 when under load and/or the presence of material variances.

In embodiments, the side member 60 may not be aligned longitudinally with the support member 40 (e.g., the side member 60 may be disposed at an oblique angle with respect to the support member 40 and/or a longitudinal direction). The first portion 62 and/or second portion 64 may be disposed at angles $\alpha_1$ and $\alpha_2$, respectively, relative to the support member 40 in a first configuration, and/or the first portion 62 and the second portion 64 may be disposed at angles $\alpha_3$ and $\alpha_4$, respectively, relative to the support member 40 in a second configuration. Angles $\alpha_1$, $\alpha_2$, $\alpha_3$, and $\alpha_4$ may or may not be equal. For example and without limitation, angle $\alpha_1$ may not be equal to angle $\alpha_2$. In embodiments, angle $\alpha_1$ and angle $\alpha_2$ may be equal such that side member portions 62, 64 are parallel to each other. With embodiments, the resilient members 70 may maintain alignment of the support member 40 with the track 30 for different relative longitudinal positions and/or different angles $\alpha_1$, $\alpha_2$, $\alpha_3$, $\alpha_4$ (e.g., longitudinal misalignment).

Figure 4A:
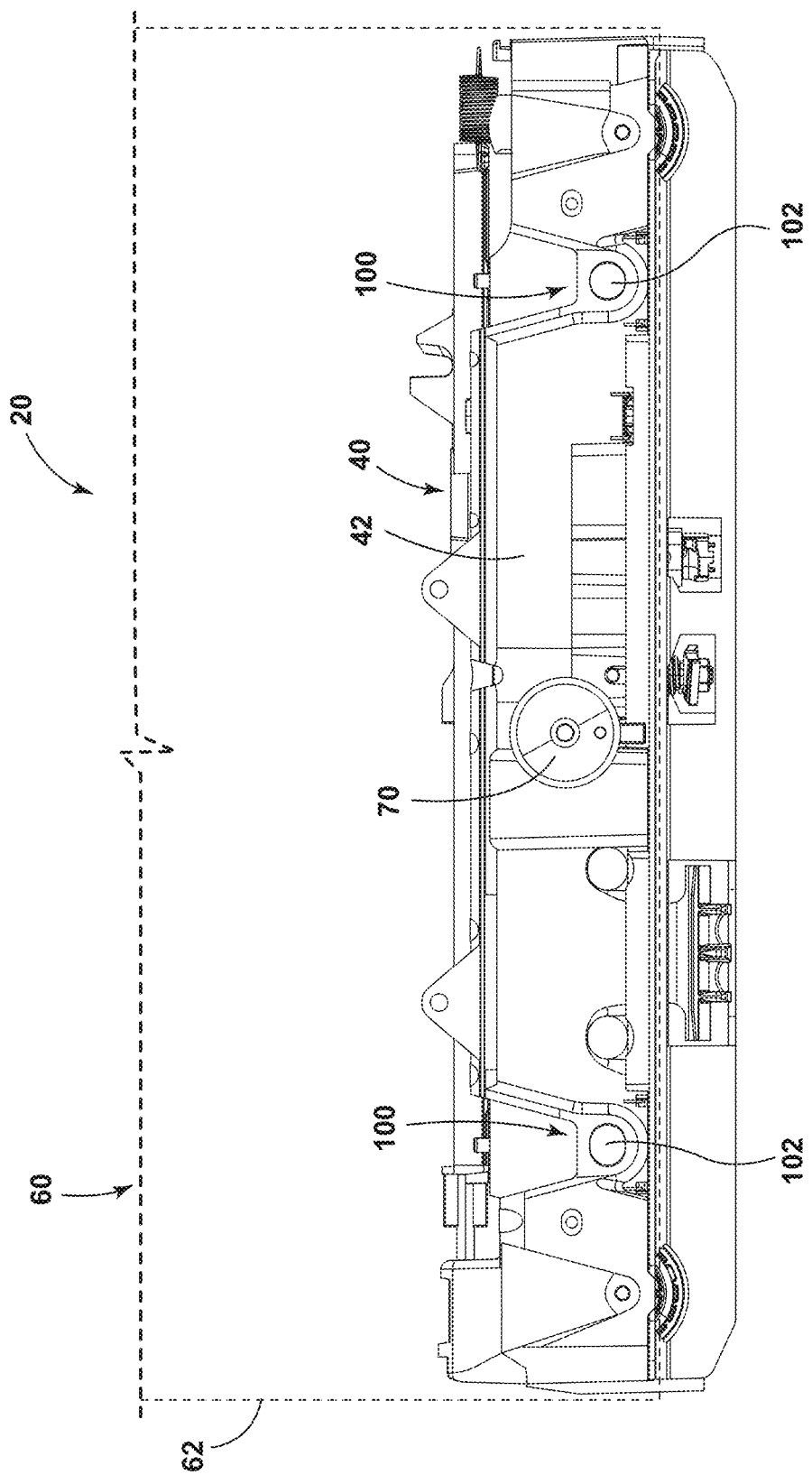
FIG. 4A is a side view generally illustrating portions of an embodiment of a support assembly.

In embodiments, such as generally illustrated in FIG. 4A, a support assembly 20 may include a single resilient member 70 disposed on an inner side 42 and/or an outer side 44 of the support member 40. The single resilient member 70 may be centered (e.g., in a longitudinal direction) on the inner side 42 and/or outer side 44 of the support member 40. With embodiments, a single resilient member 70 may be disposed on each of the inner side 42 and the outer side 44 of the support member 40 (e.g., the single resilient members 70 may be longitudinally and/or vertically aligned with each other).

Figure 4B:
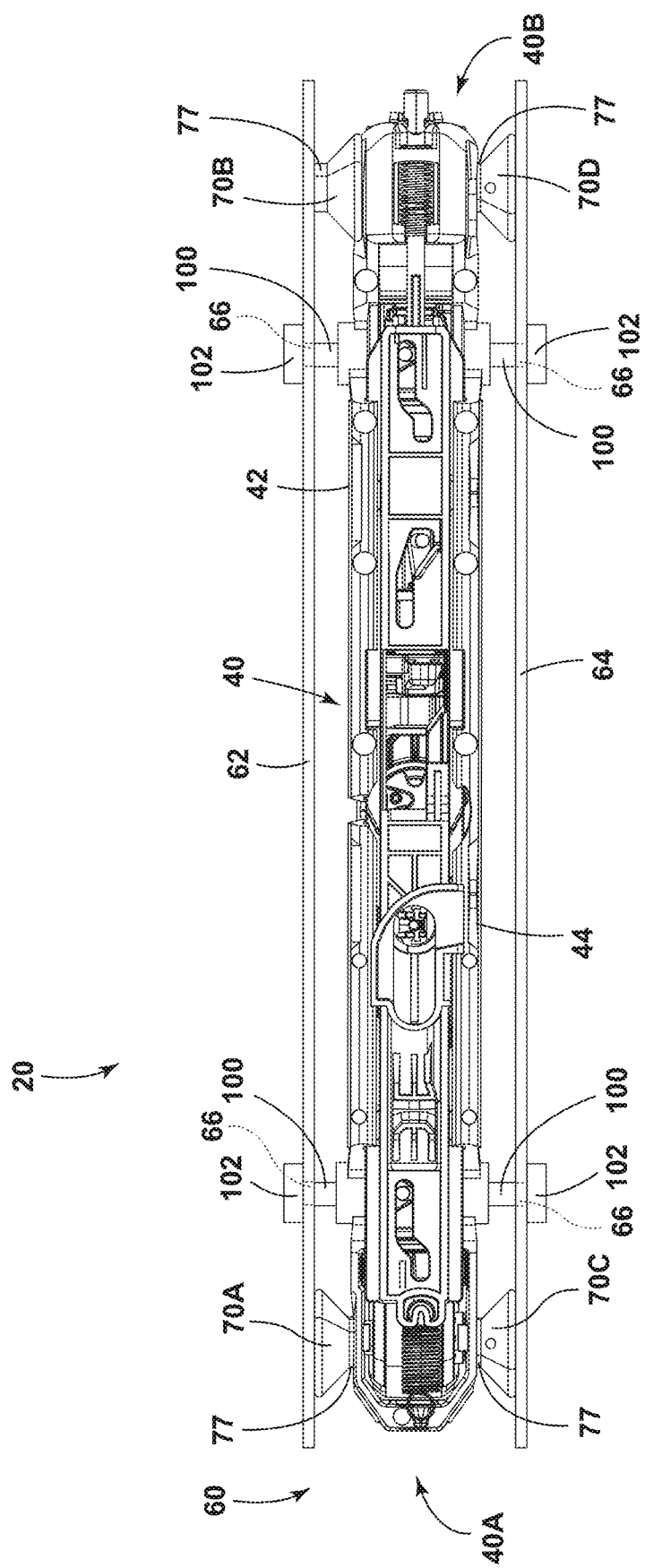
FIG. 4B is a top view generally illustrating portions of an embodiment of a support assembly.

With embodiments, such as generally illustrated in FIG. 4B, a support assembly 20 may include a first resilient member 70A, a second resilient member 70B, a third resilient member 70C, and/or a fourth resilient member 70D. The resilient members 70A, 70B, 70C, 70D may be disposed on the inner side 42 and/or the outer side 44 of the support member 40. For example and without limitation, a first resilient member 70A may be disposed at the inner side 44 of the support member 40 at or about a first end 40A of the support member 40, and/or a second resilient member 70B may be disposed at the inner side 44 of the support member 40 at or about a second end 40B of the support member 40. The third resilient member 70C may be disposed at the outer side 42 of the support member 40 at or about the first end 40A, and/or the fourth resilient member 70D may be disposed at the outer side 42 of the support member 40 at or about the second end 40B. The first resilient member 70A, for example, may be disposed opposite (e.g., longitudinally and vertically aligned) the third resilient member 70C, and/or the second resilient member 70B may be disposed opposite the fourth resilient member 70D.

In embodiments, resilient members 70 may compensate (e.g., via flexing, deforming, etc.) for forces on the side member 60, such as lateral forces that may move the side member 60 out of alignment with the support member 40. Additionally or alternatively, the resilient members 70 may be configured to compensate for different orientations (e.g., angles) of the side member 60 relative to the support member 40. For example, the resilient members 70 may be configured to maintain the position of the support member 40 relative to the track 30 with different positions of the side member 60. The resilient members 70 may prevent and/or limit deflection of the support member 40 relative to the track 30 when subjected to forces from the side member 60. In embodiments, the resilient members 70 may keep the support member 40 centered and/or aligned with the track 30 while the support member 40 moves along the track 30, which may facilitate proper locking of the cam 46, the anchoring components 47, and/or the locking component 48 even if the side member 60 is not parallel to the track 30. The resilient members 70 may limit misalignment and/or avoid disconnection between the support member 40 and the track 30. The resilient members 70 may keep the support member 40 substantially parallel to the track 30 for different angles of the side member 60. The resilient members 70 may be configured to maintain a substantially parallel alignment between the support member 40 and the track 30 when the side member 60 is not substantially parallel to the support member 40 and/or the track 30.

In embodiments, such as generally illustrated in FIGS. 4A and 4B, a support assembly 20 may include one or more connectors 100 configured to connect (e.g., positively) the support member 40 to the side member 60. A connector 100 (e.g., a bolt and/or fastener) may include an end portion 102 (e.g., a head) that may restrict and/or prevent the side member 60 from disconnecting from the connector 100. A connector 100 may limit and/or prevent movement of the side member 60 relative to the support member 40 in one or more directions. For example and without limitation a connector may substantially prevent relative vertical and/or longitudinal movement between the support member and the side member 60. A connector 100 may be configured to allow the side member 60 to move in a lateral direction (e.g., slide along the connector 100), at least to some degree. The side member 60 may move a distance less than a length L1 of the connector 100 less a width W1 of the side member 60. The resilient members 70 may or may not be connected to the connectors 100. In embodiments, a side member 60 may include an aperture 66 to receive the connector 100. The connector 100 may be connected to the inner side 42 and/or outer side 44 of the support member 40. For example and without limitation, a connector 100 may project or extend (e.g., in a lateral direction) from the inner side 42 and/or the outer side 44 of the support member 40. A connector 100 may be rigidly fixed to the support member 40.

In embodiments, such as generally shown in FIGS. 3A and 3B, A connector 100 may include a length $L_1$. The length $L_1$ of a connector 100 less a width $W_1$ of the side member 60 may correspond to a design position separation between the side member 60 and the support member 40 (e.g., in a lateral direction). The distance between an inner surface of the side member 60 and the outer surface of the support member 40 may be a first distance $D_1$.

In embodiments, the support member 40 may move along the connector 100 (and/or the connector 100 may move within the cassette). The resilient member 70 may include a length $L_2$ and may deform and/or flex with movement of the support member 40 such that the resilient member length $L_2$ is equal to the first distance $D_1$ between the side member 60 and the support member 40 (e.g., a resilient member 70 may deform to remain in contact with a support member 40 and/or a side member 60). The support assembly 20 may include a first position which may be a design position. In a design position (see, e.g., FIG. 3A), the length $L_1$ of the connector 100 may be substantially equal to the width $W_1$ of the side member 60 plus the first distance $D_1$. The support assembly 20 may include a second position (see, e.g., FIG. 3B) in which the length $L_1$ of the connector 100 may be equal to the width $W_1$ of the side member 60 plus the second distance $D_2$. The first distance $D_1$ may be greater than the second distance $D_2$. A degree of deformation of a resilient member 70 may correspond to a difference between the first distance $D_1$ and the second distance $D_2$.

In the design position, a first side 72 of a resilient member 70 may have a radius $R_1$. In the second position, the first side 72 may have a radius R2. The radius $R_1$ of the resilient member 70 in the design position may be smaller than the radius $R_2$ of the resilient member 70 in the second position (e.g., the resilient member 70 may include a greater degree of deformation in the second position than in the design position). A resilient member 70 may, for example and without limitation, compensate for a wide range of positions and/or orientations of the side member 60 relative to the support member 40 while maintaining a connection of the support member 40 with the track 30.

Figure 5:
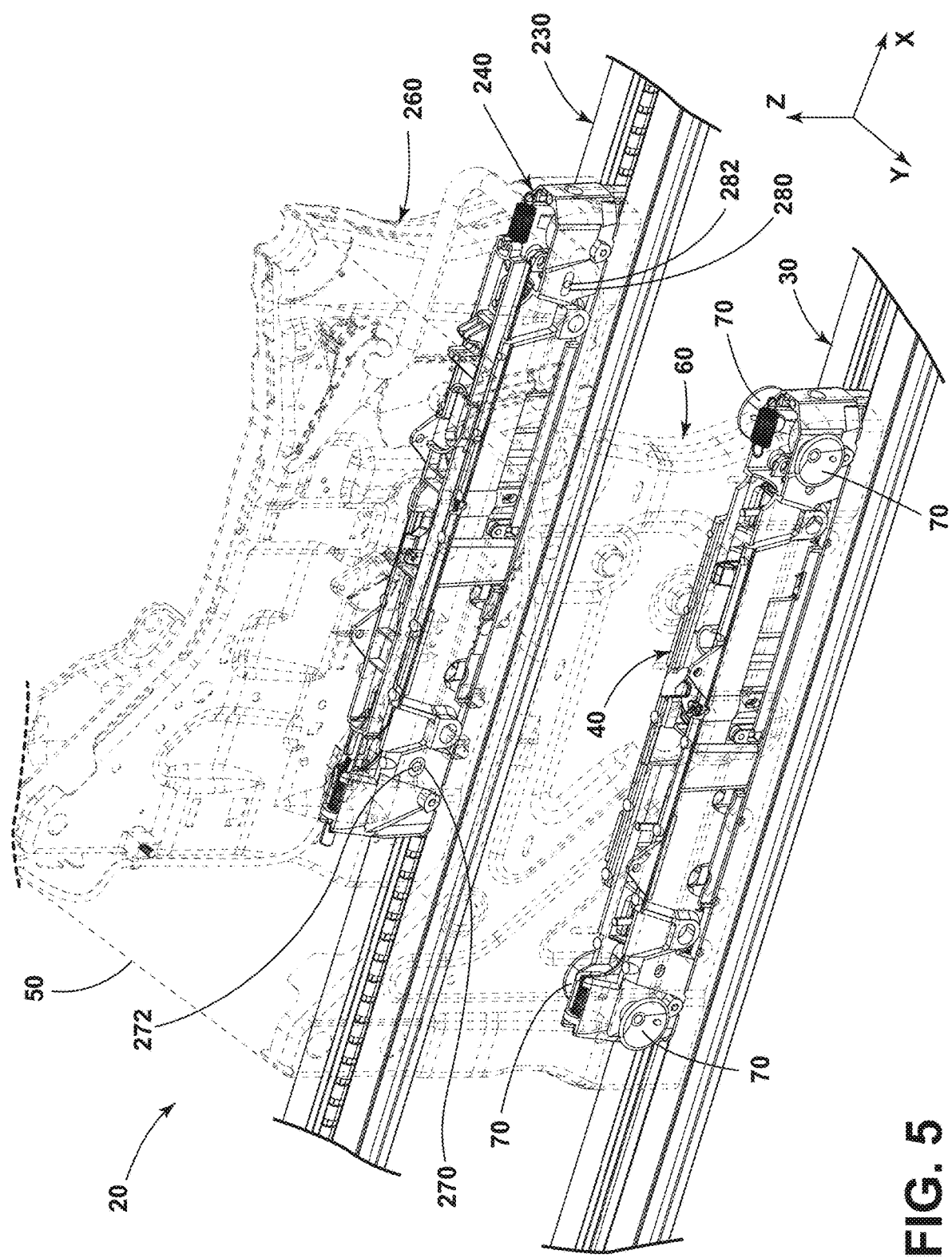
FIG. 5 is a perspective view generally illustrating portions of an embodiment of a support assembly including a support member, a side member, a track, a second support member, a second side member, and a second track.

In embodiments, such as generally illustrated in FIG. 5, a support assembly 20 may include a second side member 260, a second support member 240, and/or a second track 230. The second side member 260 may be connected to the side member 60 via an external component 50.

With embodiments, the second support member 240 and/or the second side member 260 may be substantially parallel to the second track 230. The side member 60 may or may not be substantially parallel to the second side member 260. The second support member 240 may be connected with the second side member 260 and the second track 230 such that movement of the second support member 240 in the lateral direction is substantially prevented. Additionally or alternatively, angular misalignment between the second side member 260, the second support member 240, and the second track 230 may be substantially prevented. For example, the second support member 240 may be connected to the second side member 260 substantially without play, at least in a lateral direction. The second support member 240 may or may not include resilient members 70 compensating for lateral movement of the second side member 260 relative to the second support member 240. The second support member 240 and the second side member 260 may be connected (e.g., fixed and/or rigidly connected) such as not to move laterally with respect to each other.

In embodiments, such as generally illustrated in FIG. 5, the second side member 260 may include a first aperture 270 and/or a second aperture 280. A first connector 272 may be at least partially disposed within the first aperture 270, and/or a second connector 282 may be at least partially disposed within the second aperture 280. The first connector 272 and/or the second connector 282 may include configurations that may be similar to the connectors 100, and be shorter than the connectors 100. The second side member 260 may be connected to the second support member 240 via the apertures 270, 280 and the connectors 272, 282 such that relative movement in the Y direction of the second support member 240 and the second side member 260 may be substantially prevented.

With embodiments, the first aperture 270 may include one or more of a variety of shapes, sizes, and/or configurations. For example, the first aperture 270 may be generally circular and/or rounded. The first aperture 270 may include a diameter larger than a diameter of the first connector 272, which may permit relative movement between the support member 240 and the second side member 260, at least to some degree, in the Z and/or X direction.

In embodiments, the second aperture 280 may include one or more of a variety of shapes, sizes, and/or configurations. For example, the second aperture 280 may be generally oval-shaped and/or elongated such that a width of the second aperture 280 is greater than a diameter of the second connector 282, which may permit relative movement of the second support member 240 and the second side member 260, at least to some degree, in the X direction.

In embodiments, movement (e.g., lateral and/or angular) of the second side member 260 may be compensated for by the resilient members 70 connected to the side member 60 and/or the support member 40. The resilient members 70 may compensate for different lateral positions of the side member 60 relative to the support member 40, and/or the second support member 240 may be configured to substantially prevent lateral movement of the second side member 260 relative to the second support member 240.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A support assembly, comprising:
a support member configured to engage a track;
a side member; and
a resilient member;
wherein the resilient member is in contact with the support member and the side member;
the support member is connected to the side member;
the support member includes a locking component configured to selectively restrict longitudinal movement of the support member relative to said track; and
the support member includes a connector configured to engage the side member;
and the resilient member is offset from the connector in a longitudinal direction of the support member.

2. The support assembly of claim 1, wherein the resilient member is configured to compensate for different orientations of the side member; the resilient member includes a first side and a second side; the first side includes a flange; and the resilient member is connected to the support member such that a portion of the support member is disposed axially between the flange and the second side of the resilient member.

3. The support assembly of claim 1, wherein the resilient member is configured to maintain a position of the side member relative to the track; the support assembly includes a first position and a second position; and a radius of the resilient member is smaller in the first position than in the second position.

4. The support assembly of claim 1, wherein the resilient member is configured to compensate for different lateral positions of the side member relative to the track.

5. The support assembly of claim 1, wherein the resilient member is disposed proximate a first end of the support member; and a second resilient member is disposed proximate a second end of the support member.

6. The support assembly of claim 1, wherein the resilient member and a second resilient member are disposed on a lateral side of the support member.

7. The support assembly of claim 6, including a third resilient member and a fourth resilient member; wherein the third resilient member and the fourth resilient member are disposed on a second lateral side of the support member; and the lateral side is opposite the second lateral side such that the resilient member and the second resilient member extend in an opposite direction from the support member than the third resilient member and the fourth resilient member.

8. The support assembly of claim 1, including the track, a second track, a second support member, and a second side member; wherein the second support member is connected to the second side member; and the side member is connected to the second side member.

9. The support assembly of claim 1, wherein the connector projects from a lateral side of the support member.

10. The support assembly of claim 1, wherein the resilient member is substantially cone-shaped.

11. The support assembly of claim 1, wherein the resilient member includes a vent hole configured to limit a suction effect between the resilient member and the side member or the support member.

12. The support assembly of claim 1, wherein the resilient member is substantially centered on a lateral side of the support member.

13. A support assembly, comprising:
a support member configured to engage a track;
a side member;
a resilient member; and
an additional resilient member;
wherein the resilient member is connected to the support member;
the support member is connected to the side member;
the support member includes a locking component configured to selectively restrict longitudinal movement of the support member relative to said track;
the resilient member is connected to a first lateral side of the support member;
the resilient member extends in a first direction and is configured to contact the side member; and
the additional resilient member extends from a second lateral side of the support member in second direction that is substantially opposite the first direction.

14. A support assembly, comprising:
a track;
a second track;
a side member;
a support member configured to engage the track, the support member connected to the side member;
a resilient member connected to a first lateral side of the support member;
an additional resilient member;
a second side member; and
a second support member connected to the second side member;
wherein the resilient member extends in a first direction and is configured to contact the side member;
the support member includes a locking component configured to selectively restrict longitudinal movement of the support member relative to said track; and
the additional resilient member extends from a second lateral side of the support member in second direction that is substantially opposite the first direction.

15. The support assembly of claim 14, wherein the second support member does not include a resilient member configured to compensate for lateral movement of the second side member relative to the second support member.

16. The support assembly of claim 14, wherein the resilient member compensates for different lateral positions of the side member relative to the track, and the second support member is rigidly fixed to the second side member.

17. The support assembly of claim 16, wherein the resilient member is configured to compensate for forces applied to the second side member.

18. The support assembly of claim 14, wherein the support member includes a connector configured to engage the side member; and the resilient member is offset from the connector in a longitudinal direction of the support member.

19. The support assembly of claim 18, wherein the side member includes an aperture to receive a portion of the connector.

20. The support assembly of claim 18, wherein the connector limits longitudinal and vertical movement of the side member relative to the support member.

* * * * *